J. H. WHITE.
TRACK LAYING MACHINE.
APPLICATION FILED JUNE 22, 1908.

931,166.

Patented Aug. 17, 1909.
5 SHEETS—SHEET 2.

Witnesses:
W. H. Souba.
Harry Opsahl.

Inventor:
John H. White.
By his Attorneys:
Williamson & Merchant

J. H. WHITE.
TRACK LAYING MACHINE.
APPLICATION FILED JUNE 22, 1908.

931,166.

Patented Aug. 17, 1909.
5 SHEETS—SHEET 3.

Witnesses:
W. H. Souba.
Harry Opsahl.

Inventor:
John H. White.
By his Attorneys,
Williamson & Merchant

J. H. WHITE.
TRACK LAYING MACHINE.
APPLICATION FILED JUNE 22, 1908.

931,166.

Patented Aug. 17, 1909.
5 SHEETS—SHEET 5.

Witnesses:
W. H. Souba.
Harry Opsahl.

Inventor:
John H. White.
By his Attorneys.
Williamson & Merchant

UNITED STATES PATENT OFFICE.

JOHN H. WHITE, OF FOLEY, MINNESOTA, ASSIGNOR OF ONE-HALF TO CASIMIR J. GALARNEAULT, OF FOLEY, MINNESOTA.

TRACK-LAYING MACHINE.

No. 931,166.      Specification of Letters Patent.      Patented Aug. 17, 1909.

Application filed June 22, 1908. Serial No. 439,695.

*To all whom it may concern:*

Be it known that I, JOHN H. WHITE, a citizen of the United States, residing at Foley, in the county of Benton and State of Minnesota, have invented certain new and useful Improvements in Track-Laying Machines; and I do hereby declare the following to be a full, clear, and exact description of the invention, such as will enable others skilled in the art to which it appertains to make and use the same.

My invention has for its object to provide an efficient track laying machine; and to this end, my invention consists of the novel devices and combinations of devices hereinafter described and defined in the claims.

The invention is illustrated in the accompanying drawings, wherein like notations refer to like parts throughout the several views.

In said drawings; Fig. 10 is a plan view of some of the parts shown in the pioneer car 1. B represents the section of the road-bed and track occupied by the track laying train, and whereon the rails are simply held upon the ties, properly spaced, by temporary clamps hereinafter described.

The locomotive and all the cars of the track laying train are provided with a tie tramway extending along one side thereof, and with a rail tramway extending along the other side thereof. As shown, the tie tramway is on the right side, and the rail tramway on the left side of the train of cars. These tramways are built in sections carried by the locomotive and the respective cars, so that the cars and locomotive can be properly coupled together. The driving connections for the rollers of the tramways are flexibly connected between the cars, and the longitudinal driving shafts are built in sections coupled together by knuckle joints and telescoping ends so that the shafts can have the necessary give and take or forward and backward motion to compensate for the yielding in the draft riggings. The tramways along the sides of the locomotive and cars are supported directly from the car and locomotive frames. A tie tramway and a rail tramway also extend forward from the pioneer car 1 and are provided with suitable cross bars articulated to the side bars of Fig. 2, on a larger scale. Fig. 11 is a side elevation of the parts shown in Fig. 10 with some additional parts shown in Fig. 2, but on the larger scale of Fig. 10. Fig. 12 is a detail in cross section on the line $x^{12}$ $x^{12}$ of Fig. 9. Fig. 13 is a detail in cross section on the line $x^{13}$ $x^{13}$ of Fig. 9. Fig. 14 is a detail in cross section on the line $x^{14}$ $x^{14}$ of Fig. 9.

Figure 1:
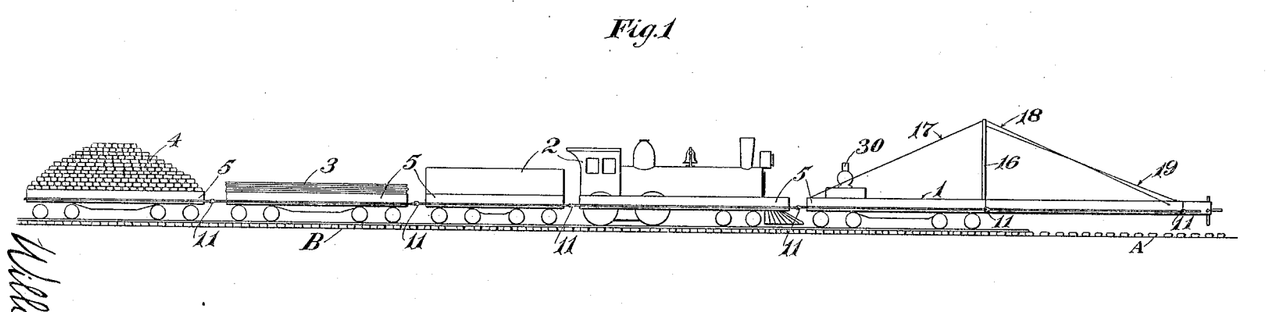
Figure 1 is a view in side elevation, chiefly in diagram lines, showing a track laying train, as employed in utilizing my invention.

Referring to Fig. 1, the numeral 1 represents the pioneer car, 2 the locomotive, 3 a working car loaded with rails, and 4 a working car loaded with ties. A represents a section of the road-bed whereon the ties are being dropped from the delivery frame of the tramways, and said parts coöperate to form a skeleton delivery frame which is supported from the pioneer car with freedom for a limited lateral or angular motion, under the control of suitable power devices on the pioneer car. At the forward end of this skeleton delivery frame there is also a tie delivery table with a cross tramway for the ties in position to receive from the longitudinal or side tramway of the delivery frame, and thus bring the ties in position to be dumped from the forward end of this delivery table in position to fall crosswise of the road-bed. The rails are delivered from the rail tramway section of the delivery frame inward and downward through this open space between the articulated elements of the delivery frame, so as to fall across the ties which have been previously dropped from the tie table properly spaced lengthwise of the road-bed. A power acting dumping device is provided for coöperation with the cross tramway of the delivery table to dump the ties, properly spaced, as the train moves forward under a slow motion. A hand or foot action leverage device is provided, for dumping the rails by lifting them up high enough on the tramway to bring their lifting supports into an inclined position from which the rails will roll off by gravity. The power is supplied by a steam engine located at the rear end of the pioneer car in position to take steam from the locomotive boiler, and this power is applied through friction clutches for driving the rollers of the tramway and the tie dumping devices at the will of the operator.

This introductory outline description will probably make clear the general design of the machine and enable the following detailed description to be more readily followed and understood.

Figure 17:
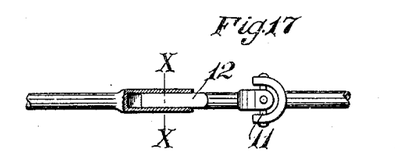
Figs. 17 and 18 are details showing the flexible and telescoping connections between adjacent sections of the tram roller driving shafts where coupled together at the end of adjacent cars.
Figure 18:
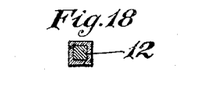

The numerals 5 represent tramway frames of the same length as the train elements to which they are secured. These frames are provided on their inner side bars with hookline hanger brackets 6 which engage with the standard socket brackets 7 of the cars supporting the same, and the car bodies are built out by abutment blocks or timbers 8 against which the lower portions of the inner side bars of the frames abut for holding the tramway sections in proper horizontal position. On these tramway frames 5 are mounted a series of driven rollers marked with the numeral 9, and a pair of master or driving rollers marked, respectively, 9$^a$ and 9$^b$, the master roller 9$^a$ being in the tie tramway set, and the master roller 9$^b$ being in the rail tramway set. On each tramway frame, extending lengthwise of the car, is located a main driving shaft for the driven members of said rollers. Each of these main driving shafts is made up of main sections 10 supported on the respective tramway frames 5 and coupled together at their joints between the cars by knuckles 11 and telescoping end sections 12, the telescoping parts of which are of rectangular form in cross section, as shown in Figs. 17 and 18. This form of connection between the main shaft sections 10 affords the necessary flexibility to the shaft to compensate for the give and take motion between the cars under the yielding action of the draft rigging, for the limited angular motion of one car in respect to the other when rounding curves, and for the up and down motion incidental to the travel of the train over the uneven new track being laid. All the driven rollers 9 connect with the shaft sections 10 by bevel gearing 13. Two tramway sections, one on each side, are hinged by vertical hinges 14 to the tramway frames of the pioneer car at the forward end of the same, and project forward therefrom and are united by end cross bars 15 pivotally connected to the outer side bars of said hinged tramway sections, and coöperating therewith to form a skeleton delivery frame with parallel ends and sides. The hinged connection of said delivery tramway frames to the fixed tramway frames of the pioneer car, and the articulated connection between the side bars and end bars of the delivery frame itself, permit the parallelogram formed thereby to shift or change from one with right angles to one with oblique angles, and, hence, allow the delivery frame to have a limited angular or lateral motion crosswise of the road-bed.

The numeral 16 represents a strong rectangular skeleton upright frame or mast arranged crosswise of the forward end of the pioneer car, with the lower ends of its standards rigidly secured to the frame or floor of the said car and its top braced and supported by rearwardly extended guy rods 17 having their upper ends fixed to the top cross bar of said mast and their lower ends anchored to the rear corners of the pioneer car. The numeral 18 represents a pair of rods having their upper ends fixed to the top cross bar of said frame 16 and the lower ends secured to the forward end portions of the delivery frame and serving to support the latter from the said mast and the pioneer car. The numeral 19 represents a pair of crossed cables, the forward ends of which are fixed to the outer forward ends of the hinged tramway frames 5, and which cables extend thence, crossing each other, to suitable guide sheaves 20 secured to the top cross bar of the mast 16, and thence downward to and are oppositely wound upon the opposite ends of a windlass 21 mounted on the mast. Said cables 19 afford means for effecting the angular or lateral movement of the delivery frame under the control of said windlass 21. The shaft of the windlass 21 is provided at one end with a spur gear 22 engaged by pinion 23 on a hand shaft 24 journaled in the adjacent standard of the mast. The windlass may be provided with suitable detents (not shown) for holding the windlass at any desired point in its winding or unwinding motion. The forwardly extending guy rods 18 will spring enough to permit the limited angular movement of the skeleton delivery frame.

The numeral 25 represents what I call the tie delivery table which is connected by vertical hinges 26 to the forward ends of the hinged tramway frames 5 of the skeleton delivery frame. In the table 25 are mounted a series of toothed rollers, marked $9^c$, set on radial lines convergent toward the center of the delivery frame and of different lengths, with the longer nearer the center of the table. The said rollers $9^c$ are connected by bevel gearing 27 with a shaft 28, extending lengthwise of said table or crosswise of the road-bed, and having its right hand end connected by bevel gearing 29 with the adjacent short section of the line shaft 10 of the tramway on the right hand side of the frame. The toothed rollers $9^c$ and the table 25, supporting the same, constitute a cross tramway, for coöperation with the main or longitudinal tramway for the ties, and is in position to receive the ties from the said main tramway and gradually turn the same to a position crosswise of the road-bed. This cross tramway or table 25 and parts supported thereby, in virtue of its hinged connections 26 to the skeleton delivery frame, will always be carried by the said frame crosswise of the road-bed or parallel with the forward end of the pioneer car, regardless of the angular motion of the said skeleton delivery frame.

Figure 2:
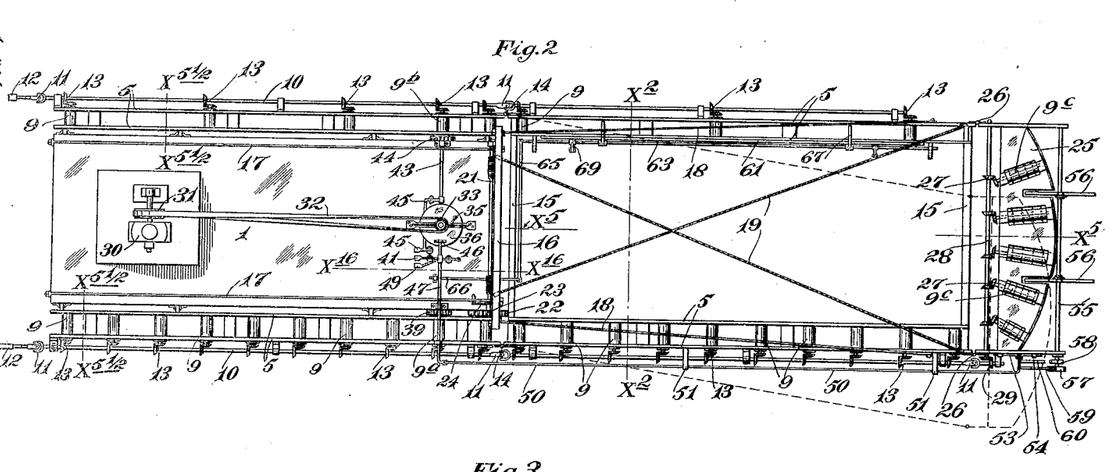
Fig. 2 is a plan view of the pioneer car and its tie and rail delivery frame organized in accordance with my invention.
Figure 3:
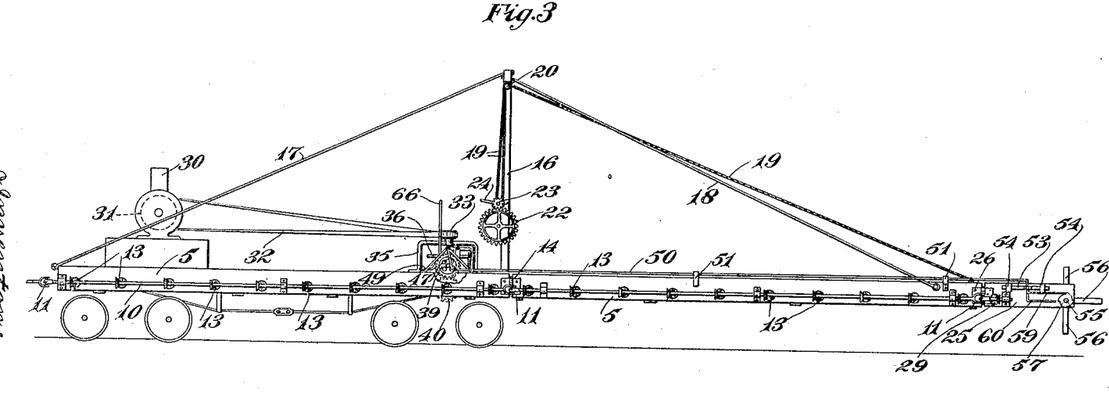
Fig. 3 is a side elevation of the parts shown in Fig. 2.
Figure 4:
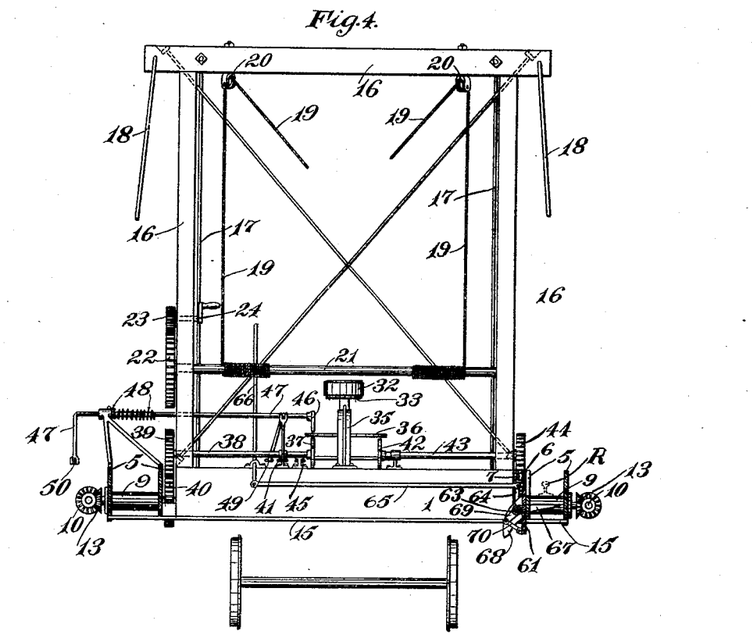
Fig. 4 is a cross section on the line $x^2$ $x^2$ of Fig. 2.
Figure 5:
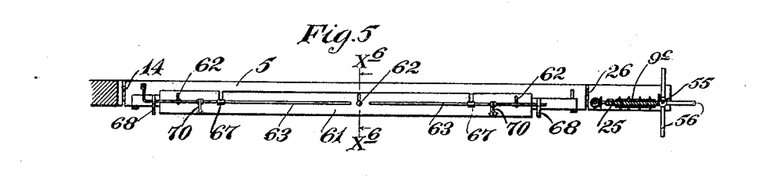
Fig. 5 is a longitudinal section on the line $x^5$ $x^5$ of Fig. 2. Fig. $5\frac{1}{2}$ is a cross section on the line $x^{5\frac{1}{2}}$ $x^{5\frac{1}{2}}$ of Fig. 2.

On the pioneer car, near the rear end of the same, is located a steam engine 30 in position to receive steam from the boiler of the locomotive through suitable piping, not shown. The engine shaft is provided with a pulley 31 connected by a cross belt 32 with a pulley 33 fixed to the upper end of a vertical shaft 34 mounted in a suitable bearing yoke 35 fixed to the floor of the pioneer car directly rearward of the upright cross frame 16, as best shown in Figs. 2, 3, 4 and 16. The shaft 34 has at its lower end a large horizontal friction disk 36 which is kept in continuous motion, by the power from the engine, through the connections just hereinbefore noted. Directly under the horizontal friction disk 36, at the right side of the center of the same, is located a vertical friction disk 37 fixed to the inner end of a shaft 38 suitably supported from the car floor and extending crosswise thereof, and having at its outer or right hand end a spur gear 39 engaging a spur gear 40 fixed to the inner end of the master roller $9^a$ of the tie tramway train, as best shown in Figs. 2 and 4. The shaft 38 is capable of slight vertical motion at its inner end, and is subject to a foot lever 41 by means of which the disk 37 may be held in frictional engagement with the under surface of the constantly running horizontal disk 36; and, when this occurs, the entire train of rollers of the tie tramways will be kept in motion through the driving connections for the same, hitherto noted.

Under the opposite side of the horizontal friction disk 36 is located another vertical friction disk 42 fixed to the inner end of a shaft 43 suitably supported from the floor of the car and extending crosswise thereof, and having at its outer or left hand end a spur gear 44 which engages a spur gear (not shown) on the inner end of the master roller $9^b$ of the rail tramway. The inner end of the shaft 43 is also capable of slight vertical motion and is subject to the action of a foot lever 45, by means of which the disk 42 can be held in frictional engagement with the constantly running horizontal disk 36; and, when this occurs, the entire train of rollers in the rail tramway will be kept in motion through the driving connections for the same, hitherto noted.

Figures 10, 11, 12, 13, 14:
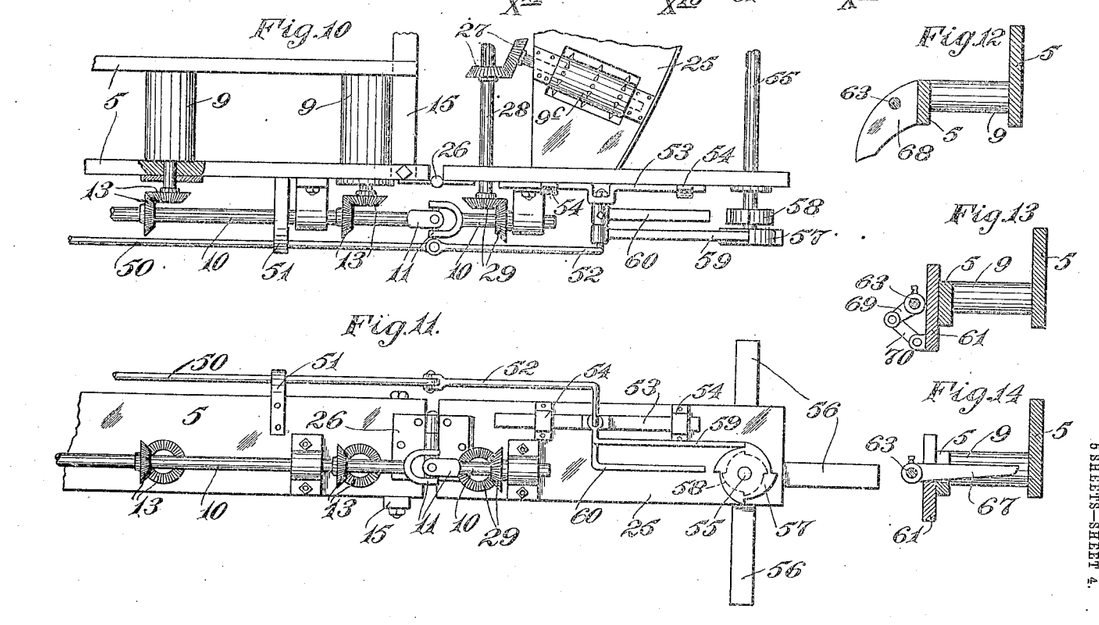

Directly above the right hand side of the horizontal friction disk 36 is another friction disk 46 of segmental form set in the vertical plane on the inner end of a rocking crank shaft 47 suitably supported from the floor of the car, and subject to a torsional spring 48 tending to hold the disk 46 at the rearward limit of its rocking motion. The inner end of this shaft 47 is also capable of a slight vertical motion and is subject to a foot lever 49, by means of which the segmental disk 46 may be made to engage with the upper face of the horizontal constantly running disk 36; and, when this occurs, a limited rocking motion will be imparted to said shaft 47. The crank arm of the shaft 47 is located at the outer or right hand end of said shaft, and is pivotally connected to the rearward end of a long rod 50 extending forward, lengthwise of the tramway frame at the right hand side of the skeleton delivery table, through suitable guiding keepers 51 fixed to said frame. To the forward end of the rod 50 is pivotally secured a rod section 52 extending forward and then downward and inward and bolted fast to a cross head slide 53 mounted in suitable keeper guides 54 fixed to the right hand end of the tie delivery table, as best shown in Figs. 10 and 11. From this description of the parts, marked 50, 52 and 53, it is obvious that all thereof will receive a forward and backward reciprocating motion, under the rocking action of the crank shaft 47.

The numeral 55 represents a cross shaft supported at the forward edge of the tie delivery table, and provided with two sets of spokes or radial arms 56 which, under the rotation of the shaft 55, work up through slots in the body of the table 25 in position to under-reach a tie located on the toothed rollers $9^c$. The right hand end of the shaft 55 is provided with a pair of reverse faced ratchet wheels, the outer of which is marked 57 and the inner of which is marked 58. On the inturned end of the rod section 52 is pivoted a long pawl 59 which coöperates with the outer ratchet wheel 57 to impart a step by step rotary motion to the shaft 55, under the reciprocation of the parts 50, 52 and 53. A shorter pawl 60 is rigidly secured to the inturned end of the rod section 52 and coöperates with the oppositely faced or inner ratchet wheel 58 to stop the shaft 55, at the proper limit of its rotary motion. The said parts marked 57 to 60, inclusive, are best shown in Figs. 10 and 11. The parts marked 46 to 60, inclusive, constitute a power action tie dumper. Whenever the segmental disk 46 is held in frictional engagement with the face of the horizontal disk 36, a forward sliding motion will be imparted to the parts 50, 52, 53, 59 and 60, thereby causing the pivoted pawl 59 to act on the driving ratchet 57 and turn the shaft 55 far enough to make the spokes 56 lift a tie from the toothed rollers 9ᶜ and carry the same upward and outward far enough to clear the table, whereupon the dropping tie will impart a further motion to the shaft 55 sufficient to bring the next set of spokes 56 in proper position for action on the next tie; at which instant, the detent or retaining pawl 60, acting on the ratchet 58, will stop the said shaft 55. Then the operator will release the foot lever controlling the segmental disk 46, and the torsional spring 48 will return said shaft 47 and all its connected parts back rearward to their normal position. It follows, therefore, that the operator has complete control of this power action tie delivery mechanism; and under a slow forward motion of the train can drop the ties, by power, properly spaced crosswise of the road-bed.

Figure 6:
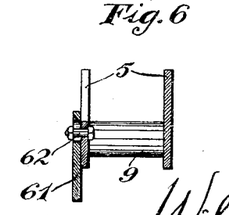
Fig. 6 is a cross section on the line $x^6$ $x^6$ of Fig. 5.
Figure 7:
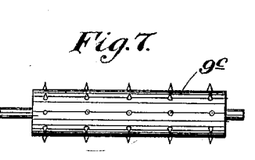
Figs. 7 and 8 are details showing one of the toothed tram rollers detached, in plan view and end elevation, respectively.
Figure 8:
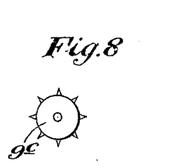
Figure 9:
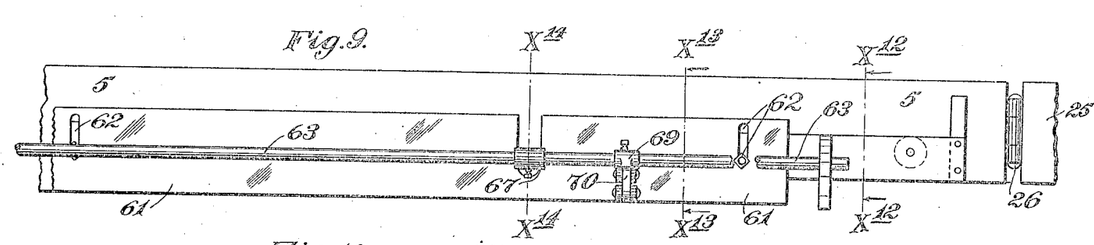
Fig. 9 is a view in the same plane as Fig. 5, showing some of the parts thereof on a larger scale.

The rail delivery tramway, forming a part of the skeleton delivery frame, has an inside guard-board 61 connected to the said tramway frame by slot and pin connections 62, as best shown in Figs. 6 and 9, thereby making this guard-board 61 capable of a limited up and down motion on the frame. A rock shaft 63 is supported inward of said guard-board 61, on suitable bearings fixed to and projecting from said tramway frame, as best shown in Figs. 9 to 14, inclusive. This rock shaft 63 is provided with a crank arm 64 at its rear end connected by link 65 with a hand lever 66 suitably mounted on the pioneer car within reach of the operator standing in position to operate the foot action clutch levers, hitherto noted, as best shown in Fig. 4. The said rock shaft 63 is provided with lifting feet or crank levers 67, best shown in Figs. 4, 9 and 14; which lifting feet 67 project outward, crosswise of the rail tramway, through suitable openings in the tramway frame in position to underreach the rail R and to lift the same into the position shown in Fig. 15, whereupon gravity will become operative to cause the rail to roll downward and drop through the central opening of the delivery frame onto the underlying ties. The tramway frame is provided with suitable guarding guides 68 fixed thereto and extending inward and downward on the proper lines to prevent the dropping rail from striking the rock shaft 63 or any of its connected parts. The rock shaft 63 also has a pair of crank arms 69 extending downward and inward and connected by links 70 with the vertically movable guide-board 61, hitherto noted, as best shown in Figs. 9 and 13; and these parts are so related to each other and to the lifting feet 67 that the guide-board 61 will be lowered to its limit before the feet 67 raise the rail into dumping position. It follows, of course, that the rail does not have to be lifted so high as it otherwise would to clear the tramway frame.

Figures 15, 16, 19:
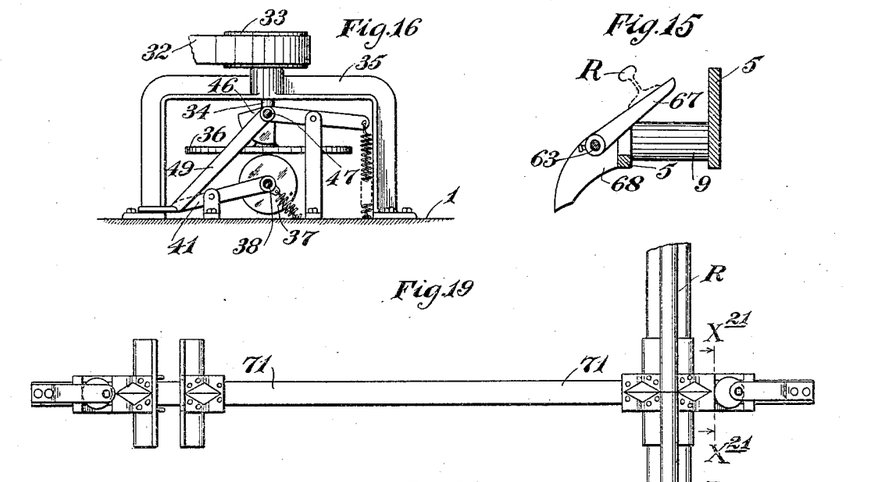
Fig. 15 is a cross section through the parts shown in Fig. 9 on the same section line as Fig. 12, but with the parts shown in rail dumping position.
Fig. 16 is a view showing the friction clutch devices in elevation as they would appear to an observer looking in at the same from the right side of the car, with all the parts removed outside of the line $x^{16}$ $x^{16}$ of Fig. 2.
Figs. 19 and 20 are, respectively, plan and end views showing the rail spacing clamp which is employed to temporarily hold the rails properly spaced apart on the underlying ties.
Figure 20:
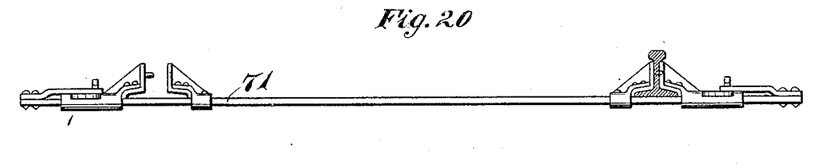
Figure 21:
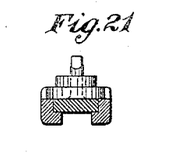
Fig. 21 is a detail in cross section on the line $x^{21}$ $x^{21}$ of Fig. 19.

As stated in the general introduction, the ties are first dropped, in succession, crosswise of the road-bed while the train is moving forward very slowly, thereby approximately spacing the ties, in respect to each other, lengthwise of the road-bed. Meantime, a pair of rails have been brought forward onto the two forward tramway sections, at the left side of the train, and as soon as enough ties are laid, the train is stopped and the pair of rails are dumped, in succession, onto the underlying ties. Then the train is moved back a short distance, and the temporary clamps 71 are applied, as shown in Figs. 19, 20 and 21, to hold the rails properly spaced on the ties. These temporary clamping devices are of the proper form to afford temporary fish plates at the joints between the rails, and also to hold the rails, properly spaced, at any desired intermediate points between the rail joints. Then the train is moved forward over the newly laid pair of rails, and the same operations are duplicated to lay the next forward section of the track. The ballasting train follows the track laying train to complete the road-bed, properly adjust the ties, apply the permanent rail joint plates and to spike the rails to the ties, in the usual way. It is, of course, obvious that there should be enough temporary clamps 71 to lay a section of track a little longer than the length of the track laying train.

It must be obvious that the track laying machine, herein disclosed, is capable of rapidly laying a new track, on a roughly graded road-bed, and of doing this at a great saving of human labor.

It will be understood that many of the details of the structure can be varied without departing from the spirit of my invention.

It may be further added that while the rail dumping device, as herein illustrated and described, is designed for operation by hand, I will, in practice, probably provide suitable connections for operating the same by power available from the engine on the pioneer car, and these connections would include a friction clutch member taking motion, at will, from the constantly running clutch member shown on the pioneer car.

What I claim is:—

1. In a track laying machine, the combination with a pioneer car, of a delivery frame having a tie tramway along one side thereof and also across the forward end thereof, positive means for feeding the ties from the longitudinal to the cross tramway, and positive means for dumping the ties from the cross tramway crosswise of the road-bed and approximately spaced lengthwise thereof, substantially as described.

2. In a track laying machine, the combination with the pioneer car, of a delivery frame supported from said car and projecting from the forward end of the same, which delivery frame is of skeleton rectangular form, has a tie tramway on one side thereof and across the front end thereof, is provided with positive means for dumping the ties from said front tramway crosswise of the road-bed, and has a rail tramway lengthwise of said frame on the side opposite from the tie tramway, and is provided with positive means for dumping the rails lengthwise of the road-bed crosswise of the laid ties, substantially as described.

3. In a track laying machine, the combination with the pioneer car, of a delivery frame supported therefrom and projecting from the forward end of the car, which delivery frame is provided with a tie tramway extending lengthwise thereof, and a tie tramway extending across the forward end of said frame in position to receive the ties from the longitudinal tie tramway, a tie dumping device, and power appliances for positively driving the rollers of said tie tramways and for positively dumping the ties from the forward or cross tramway, substantially as described.

4. In a track laying machine, the combination with the pioneer car, of a delivery frame supported therefrom and projecting forward thereof, which delivery frame is provided with a rail tramway along one side thereof, and with positive dumping devices adapted to dump the rails sidewise from the rail tramway inward and drop the same crosswise of the said ties, substantially as described.

5. In a track laying machine, the combination with the pioneer car, of a forwardly projecting frame of rectangular form hinged thereto and supported therefrom with freedom for lateral motion, and having its own end and side bars pivotally connected together for permitting the same to take a limited angular motion crosswise of the road-bed for delivery of the ties and rails for curved sections of track, substantially as described.

6. In a track laying machine, the combination with a pioneer car, of the delivery frame supported therefrom and projecting from the forward end thereof, which delivery frame is hinged to the car and is of skeleton rectangular form having its longitudinal or side pieces and its cross bars or end pieces pivotally connected together for permitting the frame to have a limited angular motion crosswise of the road-bed, and a windlass on the pioner car provided with connections applied to effect the angular movement of said delivery frame, substantially as described.

7. In a track laying machine, the combination with a positive tie dumping device distinct from the tie tramways, of power connections for actuating the same, including a frictional clutch operative, at will, substantially as described.

8. In a track laying machine, the combination with the rollers of the tie tramways and the positive tie dumping device distinct from said tramways, of power connections for operating said parts including friction clutches controllable for operating said rollers and dumping device, either simultaneously or independent of each other, at the will of the operator, substantially as described.

9. In a track laying machine, the combination with the pioneer car, the tie tramway rollers, the rail tramway rollers, and the tie dumping device, of an engine on the pioneer car, a clutch member constantly driven by said engine, and driving connections for the tie tramway rollers, the rail tramway rollers and the tie dumping device, and three sets of lever actuated clutch members adapted to be thrown into frictional engagement with said constantly running clutch member, at the will of the operator, for imparting motion to the tie rollers, the rail rollers or the dumping device, simultaneously or independently of each other, substantially as described.

10. In a track laying machine, the combination with the pioneer car, of the delivery frame supported therefrom having the tie delivery table at its forward end, and the tie dumping device comprising a shaft extending across the forward edge of said table and provided with radial arms working up through slots in the table to engage the ties and dump the same therefrom, substantially as described.

11. In a track laying machine, the combination with the pioneer car, the engine and constantly running clutch member on said car, of the delivery frame having the tie delivery table at its forward end, the tie dumping shaft with radial arms working up through slots in said table and provided with a pair of oppositely faced ratchet wheels, the spring held rock shaft on the pioneer car having a segmental clutch member at its inner end and engageable, at will, with said constantly running clutch member, and the sectional rod connected to the crank arm of said spring held shaft and provided with pawls engageable with said ratchets on the shaft of the tie dumping device, substantially as described.

12. In a track laying machine, the combination with the rail delivery section of the rail tramway, of the rail dumping device comprising a rock shaft, on the frame of said tramway, having lifting feet engageable with the rail, and lever connections for operating said rock shaft, substantially as described.

13. In a track laying machine, the combination with the rail delivery section of the rail tramway having the vertically adjustable side-board on its rail dumping side, the rail dumping rock shaft and connections therefrom to said adjustable side-board for lowering the same before the rail is dumped, substantially as described.

14. In a track laying machine, the combination with the rail delivery section of the rail tramway having the vertically adjustable side-board, the rail dumping rock shaft with rail lifting feet, the connections from said shaft to said side-board for lowering the same before the rail is dumped, and the lateral guards projecting from the tramway frame inward to prevent the rail from striking said shaft and connections, when being dumped, all substantially as described.

In testimony whereof I affix my signature in presence of two witnesses.

JOHN H. WHITE.

Witnesses:
GEO. E. HANSCOM,
L. WISINEWSKI.